INVENTOR.
WILLIAM A. ZELLAR

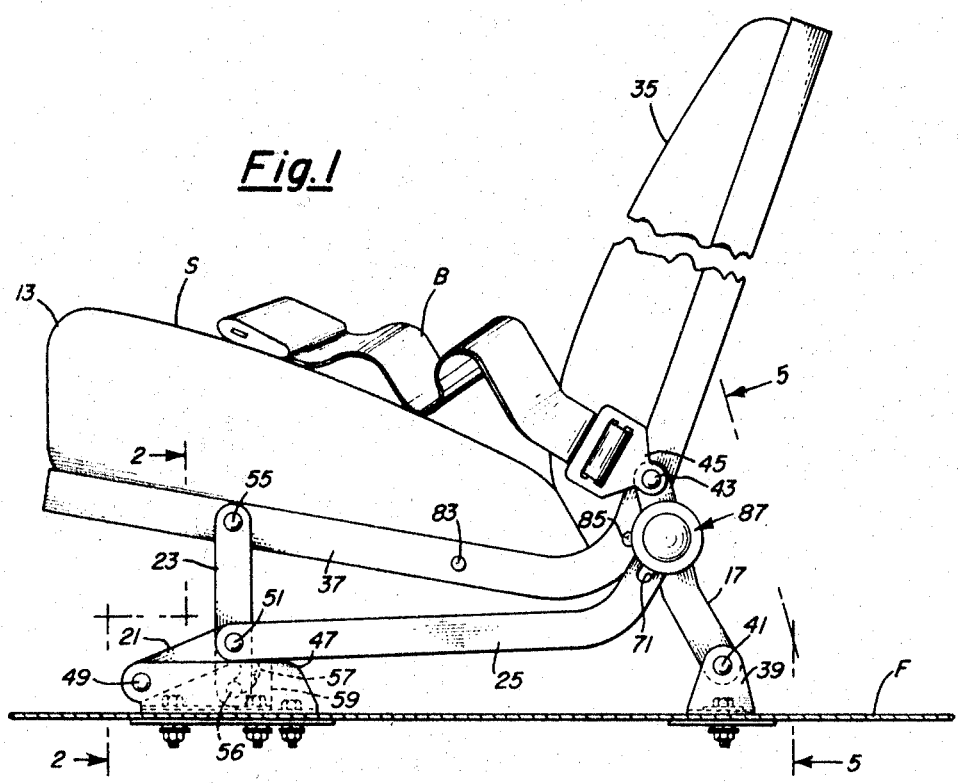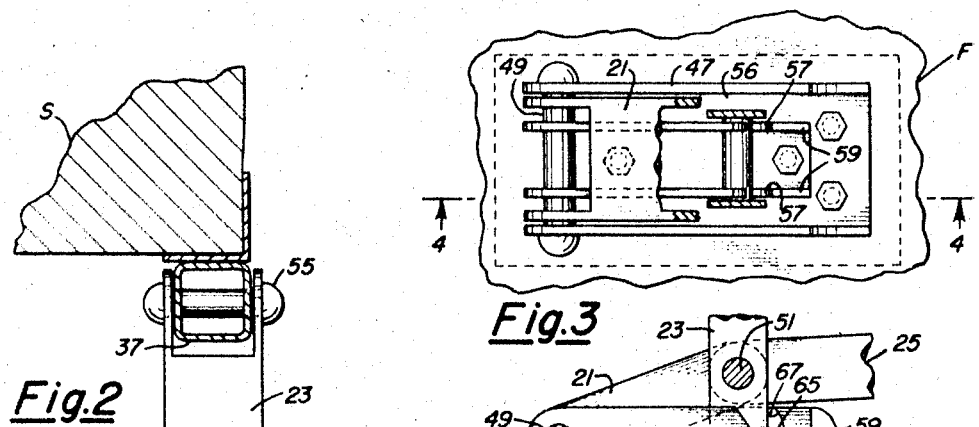

BY

ATTORNEYS

INVENTOR.
WILLIAM A. ZELLAR

ATTORNEYS

United States Patent Office 3,463,543
Patented Aug. 26, 1969

3,463,543
SAFETY SEAT
William A. Zellar, 103 L St., Shula Vista, Calif. 92011
Filed June 30, 1967, Ser. No. 650,452
Int. Cl. B60r 21/10
U.S. Cl. 297—216                                    7 Claims

ABSTRACT OF THE DISCLOSURE

A safety seat for use in a vehicle and including a forwardly facing seat portion having a normal, substantially horizontal position and actuated, inclined position, wherein such seat portion acts as a cushion to resist forward movement of a passenger seated therein. The back portion of the seat portion is supported by an upwardly and forwardly angling support arm which is pivotally connected to the vehicle body on its lower end and to the seat portion on its upper end. The front portion of such seat portion is supported by upper and lower links that are pivotally connected together on their adjacent ends by a pivot pin. The upper extremity of the upper link is pivotally connected to the seat portion and the lower extremity of the lower link is pivotally connected to the vehicle body. The links are normally arranged with the lower link angling upwardly and rearwardly from its lower extremity. A push rod connects the pivot pin with the upper portion of the support arm and forces the pivot pin forwardly when the seat portion is moved forwardly, causing the upper portion of the support arm to rotate forwardly, thus pushing the upper extremity of the lower link forwardly to cause such link to assume an upright position and raise the forward portion of the seat portion.

---

The present invention relates generally to safety seats and more particularly to a seat having support structure which is tripped by the forward momentum of a passenger in the seat resulting from rapid deceleration of the vehicle, as at the time of impact, to cause the seat to re-orient with the seat portion arranged in a somewhat vertical position.

Presently known safety seats which are to be re-oriented at the time of impact generally require stored energy, such as compressed gas or springs, to actuate them.

The safety seat of the present invention includes a seat portion which is supported at its rear end by a forwardly and upwardly angled pivotal support arm and, at its forward end, by a support assembly. The support assembly is responsive to a forward force on the seat portion and utilizes the passenger weight thereon to raise the forward portion of the seat portion and move it forwardly allowing the support arm to pivot forwardly and downwardly.

Other objects and features of the invention will become apparent from consideration of the following description taken in connection with the accompanying drawings.

In the drawings:

FIG. 1 is an elevational view of a safety seat embodying the present invention;

FIG. 2 is a partial vertical sectional view, in enlarged scale, taken along the lines 2—2 of FIG. 1;

FIG. 3 is a horizontal sectional view taken along the lines 3—3 of FIG. 2;

FIG. 4 is a vertcial sectional view taken along the lines 4—4 of FIG. 3;

Figure 9:
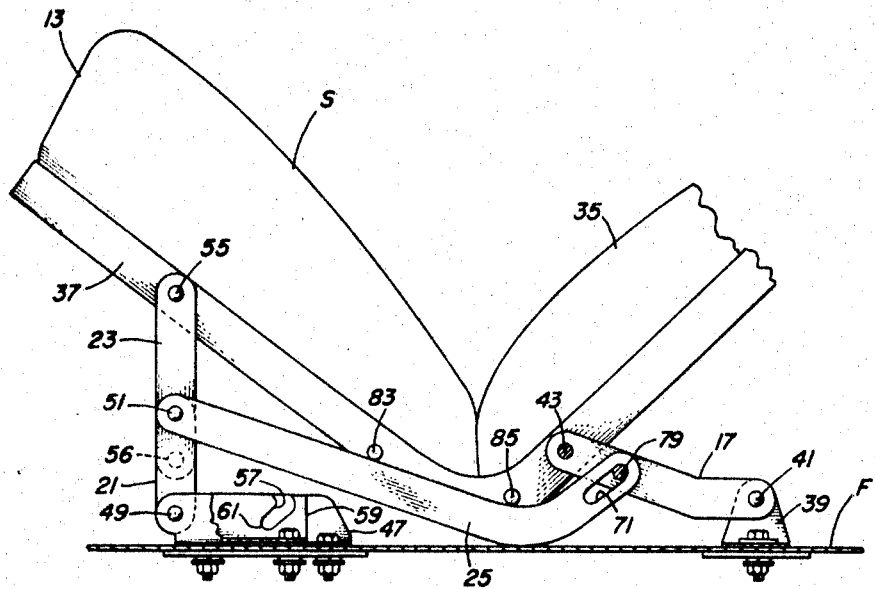
FIG. 9 is another broken side view similar to FIG. 1, and showing the seat in its actuated position.

The safety seat, as best shown in FIG. 1, includes a seat portion 13 which is normally supported in a substantially horizontal position but which, when actuated, assumes an upwardly and forwardly inclined position, as shown in FIG. 9, to resist forward movement of a passenger seated therein. The rear portion of the seat portion 13 is supported by a pivotable support arm 17 and the front portion of such seat portion is supported by a pair of links 21 and 23. The upper portion of the support arm 17 is connected with the connected ends of the links 21 and 23 by a push rod 25 which is responsive to a forward impulse on the seat portion 13 to utilize forwardly and downwardly rotation of the support arm 17 to push the connecting ends of the links 21 and 23 upwardly and forwardly to cause such links to assume an erect position, as shown in FIG. 9. In the actuated position shown in FIG. 9, the arm 17 has rotated forwardly and downwardly to lower the rear portion of the seat portion 13 and cause the push rod 25 to move the links 21 and 23 to an erect, or upright position.

Referring more in detail to the drawings, the safety seat S includes a seat portion 13 and a back portion 35. A metal frame 37 is provided for supporting the cushions of the seat portion 13 and back portion 35. The support arm 17 is supported from the vehicle floor F by a mounting bracket 39 and is connected thereto by a pivot pin 41. The upper end of the support arm 17 is connected to the frame 37 by a pivot pin 43, which pivot pin 43 also secures a seat belt fitting 45 to the frame 37. The seat belt B is affixed to the fitting 45 and can be utilized to strap a passenger in the safety seat S.

The links 21 and 23 are supported from a support bracket 47 which is affixed to the vehicle floor F and the lower link 21 is connected to such bracket by a pivot pin 49. The upper extremity of the link 21 is connected to the link 23 by a pivot pin 51, which pivot pin also connects the forward extremity of the push rod 25 to the links 21 and 23. The upper extremity of the upper link 23 is connected to the seat frame 37 by a pivot pin 55.

Referring to FIG. 4, the upper link 23 projects below the pivot pin 51 and includes a horizontally extending follower 56. The support bracket 47 includes a follower receiving groove 57 in its vertical web 59 and such groove normally supports the follower 56 at its lower end 61. The groove 57 includes a bearing surface 63 which angles upwardly and rearwardly from the lower end 61 and forms a turn 65 and then angles forwardly and upwardly to form a downwardly and forwardly facing bearing surface 67. The purpose of these bearings 63, 65, and 67 will be made apparent hereinbelow.

The rear extremity of the push rod 25 includes an elongated upwardly and rearwardly angling slot 71 and the support arm 17 includes a follower 79 which rides therein.

Figure 8:
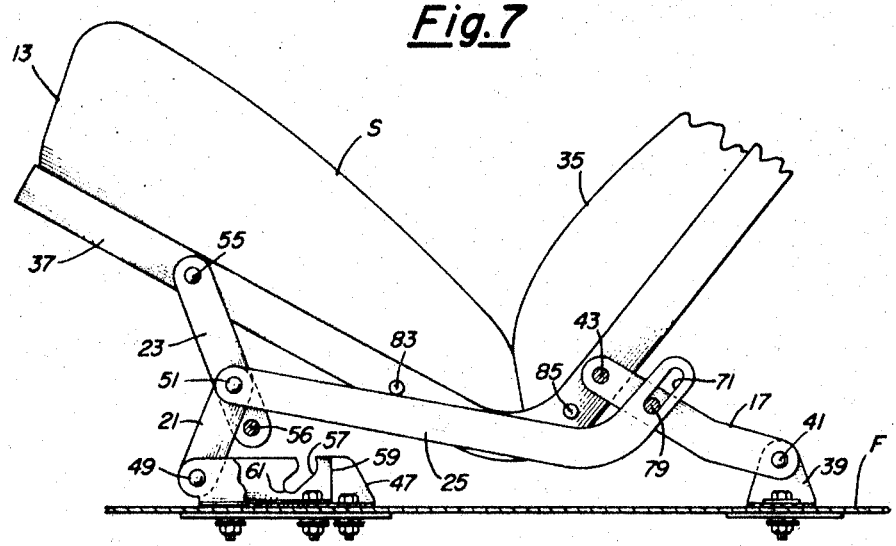
FIG. 8 is a broken side view similar to FIG. 1, but showing the seat during actuation.

The seat frame 37 includes a horizontally projecting pin 83 which overlies the push rod 25 and is adapted to engage the upper edge thereof when the seat has been actuated to the position shown in FIG. 8, to push such push rod downwardly and force the slot 71 to move forwardly with respect to the follower 79, as shown in FIG. 8. A second bearing pin 85 is disposed rearwardly of the pin 83 for engaging the upper edge of the push rod 25 when the rear extremity of the push rod has been lowered to the position shown in FIG. 9. A brake, generally designated 87, is provided for resisting movement of the rear extremity of the push rod 25 relative to the follower 79. The brake 87 is carried on the follower 79 and includes a nylon washer 89 behind the push rod 25, a second nylon washer 91 on the face of the push rod 25, a steel bearing washer 93, a convex pressure plate 95, and a second steel bearing washer 97. The follower 79 is threaded at its outer extremity for receiving an adjusting knob 99 and by screwing the knob 99 inwardly on the follower 79, the washer 91 is pressed more firmly against the push rod 25, thus squeezing it between the washer 91 and 89 and resisting movement of it relative to the follower 79.

Figure 6:
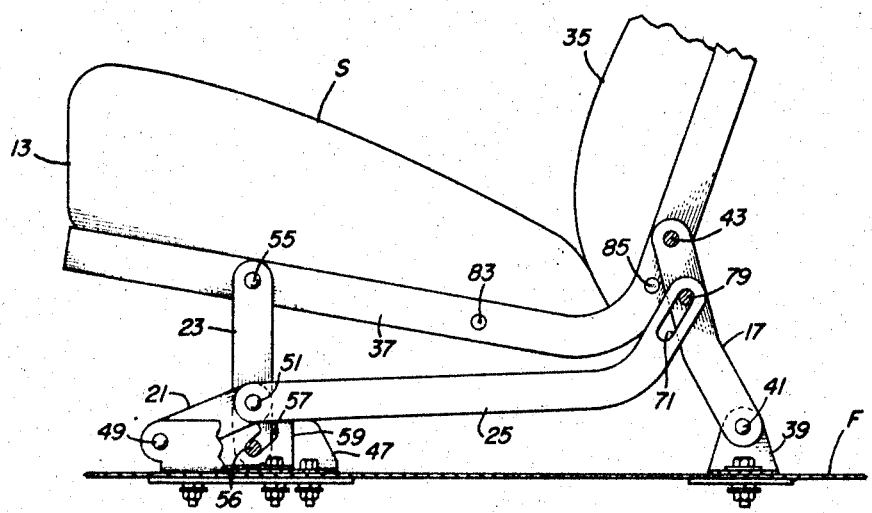
FIG. 6 is a broken side view similar to FIG. 1.
Figure 5:
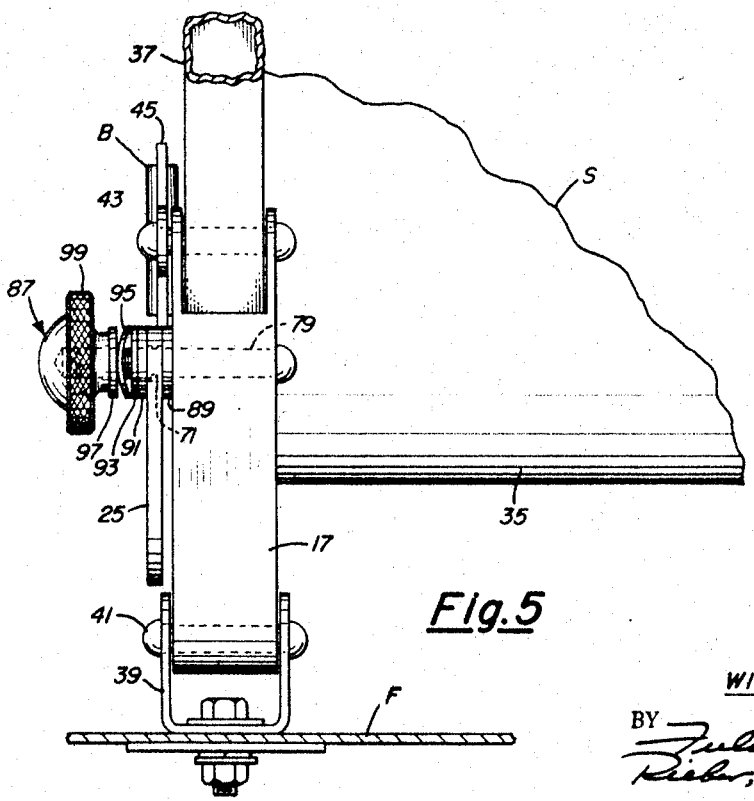
FIG. 5 is a partial sectional view, in enlarged scale, taken along the lines 5—5 of FIG. 1.

In operation the safety seat S is normally supported in the position shown in FIGS. 1 and 6. In the normal position the rear portion of the seat portion 13 is carried by the arm 17 and the weight thereof presses forwardly and downwardly on the upper extremity of the arm 17. Downward rotation of the arm 17 is resisted by the push rod 25 which pushes forwardly on the lower extremity of the upper link 23; forward rotation of such lower extremity being resisted by the follower 56 abutting the end 61 of the groove 57. The weight of the forward portion of the seat portion 13 is supported by the link 23 and serves to press the pin 55 firmly against the lower end 61 of the curved slot 57. Thus, the forward face on the push rod 35 tends to pivot the lower link 21 upwardly around its lower pivot pin 49 but the weight on the forward portion of the seat portion 13 resists such movement.

Figure 7:
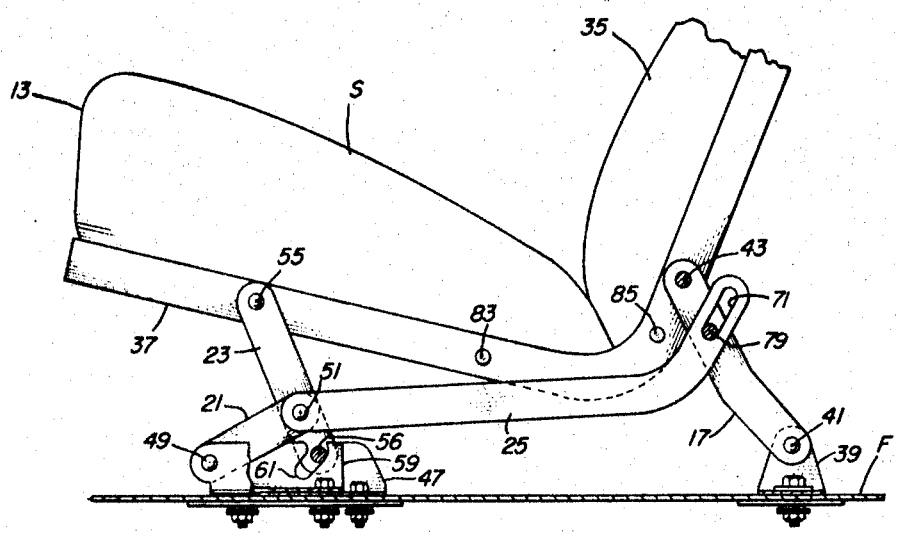
FIG. 7 is a broken side view similar to FIG. 1, but showing the seating as it is actuating.

When forward motion of the vehicle in which the safety seat S is installed is abruptly decreased, the forward momentum of the passenger supported on the seat portion 13 will cause a forward force on the seat portion and tend to rotate link 23 forwardly and downwardly around the pivot pin 51 and the support arm 17 forwardly and downwardly around the lower pivot pin 41. Downward rotation of the support arm 17 and link 23 is enabled by travel of the follower 79 downwardly in the notch 77 and the rearwardly and upwardly travel of the follower 56 in the notch 57. The follower 79 reaches the lower end of a notch 77 simultaneously with the followers 56 reaching the turn 65 in the intermediate portion of the notch 77. This is shown most clearly in FIG. 7. At this time the seat portion 13 has gained considerable forward momentum and the arm 17 will continue to rotate forwardly and downwardly. When the follower 79 strikes the lower end of the notch 77 and the push rod 25 will force the pivot pin 51 connecting the links 21 and 23 forwardly and upwardly, thus rotating the lower link 21 around its lower pivot pin 49. Forward movement of the lower extremity of the upper link 23 is enhanced by the fact that its follower 56 strikes the turn 61 and is forced upwardly and forwardly along the angled bearing surface 67 of the groove 57. Continued downward rotation of the support arm 17 pushes the link connecting pivot pin 51 further forward elevating the forward portion of the seat portion 13 concurrent with downward movement of the back portion of such seat portion.

When safety seat S reaches the position shown in FIG. 8, the bearing pin 83 contacts the upper edge of the push rod 25 and forces it to rotate downwardly around the link connecting pivot pin 51. Such downward rotation forces the rear extremity of the push rod 25 to move downwardly faster than the rapid rate and follower 79 forces the slot 71 to slide forwardly relative to such follower 79, thus moving the link connecting pivot pin 51 forwardly and at increased speed. Such increase speed of forward movement of the pivot pin 51 causes the forward portion of the seat portion to be elevated at a much more rapid rate than without the action of the bearing pin 83. When the push rod 25 has caused the links 21 and 23 to assume a nearly erect position, the rear bearing pin 85 contacts the rear portion of the push rod 25 and, since such bearing pin is moving downwardly at a faster rate than the bearing pin 83, downward movement of the rear extremity of the push rod 25 is again increased and such bearing pin 85 continues to act until the links 21 and 23 have assumed their fully erect position as shown in FIG. 9.

While the push rod 25 has been utilized in the preferred embodiment to control the movement of the forward portion of the seat portion 13, it will be clear that the links 21 and 23 could be provided with interacting cam surfaces to cause them to follow essentially the same path as that affected by the push rod 25. With interacting cam surfaces of that type, the forward momentum of the passenger on the seat portion 13 would cause the support arm 17 to start its downward and forward rotation and the links 21 and 23 would be forced to progressively raise the forward portion of the seat portion 13 to the elevation shown in FIG. 9. Also, the slot 71 at the rear extremity of the push rod 25 could be eliminated and replaced with an ordinary pivotal connection, but such an arrangement would result in the seat portion 13 having a less inclined position when fully actuated.

For various weights of passengers, it may be desirable to adjust the safety seat S such that various amounts of forward momentum are required to trip it. Thus, he adjustment knob 99 on the brake 87 can be tightened to cause a greater amount of forward force on the seat portion to be required for effecting relative movement between the rearward extremity of the push rod 25 and the follower 79. Normally when the driver of an automobile depresses the clutch and brake, he will resist forward movement of his body by the force transmitted through his legs. Consequently, a mere application of the brakes would not generally actuate the driver's safety seat S because there will be no forward force transmitted to the seat portion 13. However, if desirable, the brake 87 could be adjusted to completely prevent actuation of the seat S.

Clearly any forward movement on the seat portion 13 will tend to move the seat portion forwardly, thus tripping the seat, but when the seat belt B is fastened around the passenger's lap, forward movement of the passengers will be transmitted to the seat frame 37 and will enhance the rapidness of actuation of the seat S. Also, connection of the belt B at the upper extremity of the arm 17 provides an extremely effective forward force on such arm to initiate actuation of the seat S. If desired, actuation of the seat S could be effected by a spring (not shown) triggered by a solenoid (not shown) responsive to the pressure in the automobile hydraulic brake system. With such an arrangement, seat actuation would not rely on forward momentum of the passenger but would be responsive to a forceful application of the brakes.

From the foregoing it will be clear that the safety seat S of this invention provides a convenient, economical, and foolproof means for preventing injury to a passenger seated therein in case of a head-on collision. The seat is actuated entirely by the forward force of the passenger sitting therein and does not depend on stored energy of any kind. The harder the impact, the more forward force there will be on the seat portion 13 and the more rapidly the seat will assume its actuated position, shown in FIG. 9. The seat is in its actuated position, the passenger, rather than being thrown forwardly out of the seat by a collision, will merely be pressed harder down into the seat portion 13 and the so-called dangerous injury inflicting, secondary impact is avoided.

Various modifications and changes may be made with regard to the foregoing detailed description without departing from the spirit of the invention.

I claim:
1. A safety seat for use in a vehicle and comprising in combination:
(A) a seat portion facing forwardly in the vehicle and having a normal position and an actuated position which is inclined with the forward portion of the said seat portion elevated above the back portion to cause the seat portion to serve as a cushion to resist forward movement of a passenger sitting therein;

(B) an upwardly and forwardly angling support arm pivotally attached on its lower extremity to the floor of the vehicle and on its upper extremity to the rear portion of the seat portion;

(C) an actuating assembly mounted on the vehicle and cooperating with the support arm (B) for supporting the forward portion of said seat portion (A), the assembly being normally in a lowered position to support the forward portion of the seat portion in its normal position and being actuable by forward movement of the seat portion to raise the forward portion of the seat portion and move the seat portion forwardly to cause the upper extremity of the support arm (B) to rotate forwardly and downwardly, thereby moving the seat portion into its actuated position;

(D) a stop for limiting downward movement of the forward portion of the seat portion (A) to support it with the seat portion in its normal position;

(E) a brake for resisting actuation of said seat.

2. A safety seat for use in a vehicle and comprising in combination:

(A) a seat portion facing forwardly in the vehicle and having a normal position and an actuated position which is inclined with the forward portion of the said seat portion elevated above the back portion to cause the seat portion to serve as a cushion to resist forward movement of a passenger sitting therein;

(B) an upwardly and forwardly angling support arm pivotally attached on its lower extremity to the floor of the vehicle and on its upper extremity to the rear portion of the seat portion;

(C) an actuating assembly mounted on the vehicle and cooperating with the support arm (B) for supporting the forward portion of said seat portion (A), the assembly being normally in a lowered position to support the forward portion of the seat portion in its normal position and being actuable by forward movement of the seat portion to raise the forward portion of the seat portion and move the seat portion forwardly to cause the upper extremity of the support arm (B) to rotate forwardly and downwardly, thereby moving the seat portion into its actuated position, said actuating assembly including:

(1) a first link pivotally supported on its lower extremity from said vehicle and angling upwardly and rearwardly when said seat portion is in its normal position;

(2) a second link pivotally supported on its lower extremity from upper extremity of said first link, said second link extending upwardly from said first link;

(3) control means for controlling the movement of said first and second links to cause said first link (C)(1) to progressively assume a more erect position as said seat portion moves forwardly, whereby said second link (C)(2) is elevated to elevate the forward portion of said seat portion (A);

(D) a stop for limiting downward movement of the forward portion of the seat portion (A) to support it with the seat portion in its normal position.

3. A safety seat as set forth in claim 2 wherein said control means (C)(3) include:

(a) an elongated push rod pivotally attached to said actuating assembly (C) on its forward extremity and to said support arm on its rearward extremity for pushing said upper extremity of said first link and said lower extremity of said second link forwardly upon forward and downward rotation of said support arm to cause said first link to progressively assume a more erect position to progressively elevate the forward portion of said seat portion.

4. A safety seat as set forth in claim 3 wherein said push rod (C)(3)(a) forms an elongated downwardly facing upwardly and rearwardly angled slide surface and wherein said support arm (B) includes pin means for abutting said slide surface and wherein, further, said seat portion (A) includes:

(1) a guide for abutting the intermediate portion of said push rod during downward and forward movement of said seat portion to face the rearward extremity of said push rod downwardly at a greater rate than said pin means whereby said slide surface is forced to move downwardly and forwardly along said pin means thereby moving said push arm forwardly relative to said support arm to cause said upper and lower extremities of said respective first and second links to move forwardly relative to said pin means.

5. A safety seat as set forth in claim 2 wherein said second link (C)(2) extends below the pivotal connection between said first and second links, and includes:

(a) a follower disposed below said pivotal connection between said first and second links (C)(1) and (C)(2), respectively;

and said safety seat includes:

(E) a mounting bracket that includes:

(1) a bearing surface, which angles upwardly and rearwardly from said stop (D), for supporting sliding movement therealong of said follower, whereby said follower is normally supported on said stop and slides upwardly along said bearing surface (E) upon initial actuation of said seat to enable the upper extremity of said second link (C)(2) to pivot forwardly.

6. A safety seat as set forth in claim 5 wherein said mounting bracket (E) includes:

(2) limit means for limiting movement upwardly along said bearing surface (E)(1) of said follower (C)(2)(a), whereby forward rotation of the upper extremity of said second link (C)(2) is stopped simultaneously with actuation of said control means (C)(3) to commence forward rotation of the upper extremity of said first link (C)(1).

7. A safety seat as set forth in claim 5 wherein said support arm (B) includes:

(1) a follower disposed intermediate its ends;

and wherein said safety seat includes:

(F) an elongated rod, pivotally connected, on its forward end, to said second link (C)(2) and forming an upwardly and rearwardly angled slot at its rearward extremity for receiving said follower, said slot being shaped to normally retain said follower (B)(1) at its upper end and to enable said follower (B)(1) to move downwardly therein in response to a forward force on said seat portion (A).

References Cited

UNITED STATES PATENTS

| | | | |
|---|---|---|---|
| 2,270,172 | 1/1942 | Ruegger | 297—329 |
| 2,660,222 | 1/1953 | Woodsworth | 297—216 |
| 2,823,730 | 2/1958 | Lawrence | 297—216 |
| 2,920,684 | 1/1960 | Fante et al. | 297—329 X |
| 3,357,736 | 12/1967 | McCarthy | 297—216 |

FOREIGN PATENTS 691,437   5/1940   Germany.

JAMES T. McCALL, Primary Examiner

U.S. Cl. X.R.

297—329